United States Patent
DeHart et al.

(10) Patent No.: US 7,756,917 B2
(45) Date of Patent: Jul. 13, 2010

(54) TWO WIRE COMMUNICATION APPARATUS AND METHOD

(75) Inventors: Scott Alan DeHart, Eagle, ID (US); Franklin Timothy Hickenlooper, Boise, ID (US)

(73) Assignee: Baseline, LLC, Meridian, ID (US)

( * ) Notice: Subject to any disclaimer, the term of this patent is extended or adjusted under 35 U.S.C. 154(b) by 2360 days.

(21) Appl. No.: 10/256,485

(22) Filed: Sep. 26, 2002

(65) Prior Publication Data

US 2003/0097482 A1    May 22, 2003

Related U.S. Application Data

(60) Provisional application No. 60/326,074, filed on Sep. 28, 2001.

(51) Int. Cl.
*G06F 15/16* (2006.01)
*G06F 15/173* (2006.01)

(52) U.S. Cl. .................. 709/200; 709/224
(58) Field of Classification Search ......... 709/223–225, 709/208, 200
See application file for complete search history.

(56) References Cited

U.S. PATENT DOCUMENTS

| | | | | |
|---|---|---|---|---|
| 6,112,246 | A * | 8/2000 | Horbal et al. | 709/230 |
| 6,298,377 | B1 * | 10/2001 | Hartikainen et al. | 709/223 |
| 6,397,220 | B1 * | 5/2002 | Deisinger et al. | 707/102 |
| 6,473,783 | B2 * | 10/2002 | Goshey et al. | 709/203 |
| 6,615,212 | B1 * | 9/2003 | Dutta et al. | 707/10 |
| 6,801,507 | B1 * | 10/2004 | Humpleman et al. | 370/257 |
| 6,993,585 | B1 * | 1/2006 | Starkovich et al. | 709/228 |
| 7,269,660 | B1 * | 9/2007 | Westfield | 709/230 |

* cited by examiner

*Primary Examiner*—Hussein A. Elchanti
(74) *Attorney, Agent, or Firm*—Huntsman Law Group, PLLC; Robert A. Huntsman (57) ABSTRACT

A method and apparatus for operating and actuating remote devices using a single pair of wires together with communication and networking protocols necessary for operational control of the remote devices and data gathering activities from the remote devices. The invention leverages the use of existing wiring and is particularly useful in heating and air conditioning systems, sprinkler control systems, security systems, lighting control systems, industrial automation control systems and similar environments.

51 Claims, 5 Drawing Sheets

320 — | address | command | data 0 | data 1 | data 2 | data 3 | data 4 | data 5 | data 6 | data7 | data 8 | status | checksum | checksum |
|---|---|---|---|---|---|---|---|---|---|---|---|---|---|
| 0 | 1 | 2 | 3 | 4 | 5 | 6 | 7 | 8 | 9 | 10 | 11 | 12 | 13 |

Fig. 4A

320' — | address | command | pass through data (encapsulated message) ||||||||| status | checksum | checksum |
|---|---|---|---|---|---|---|---|---|---|---|---|---|---|
| 0 | 1 | 2 | 3 | 4 | 5 | 6 | 7 | 8 | 9 | 10 | 11 | 12 | 13 |

Fig. 4B

400 — | address | command | data 0 | data 1 | data 2 | data 3 | status | checksum | checksum |
|---|---|---|---|---|---|---|---|---|
| 0 | 1 | 2 | 3 | 4 | 5 | 6 | 7 | 8 |

Fig. 4C

TWO WIRE COMMUNICATION APPARATUS AND METHOD

CROSS-REFERENCE TO RELATED APPLICATIONS

This application claims priority of provision patent application No. 60/326,074 filed Sep. 28, 2001.

BACKGROUND OF THE INVENTION

Numerous systems exist where a signal of some type is superimposed on a power signal. In these systems, the communication information is separated from the power signal in the frequency spectrum such that through proper frequency separation techniques and with proper encoding and decoding techniques the information can be extracted from the power signal. These systems can perform very well and meet many design needs. Systems comprising a high frequency carrier, upon which is impressed the encoded information, requires a tightly specified and controlled transmission medium such that the high frequency carrier is not lost and signal integrity is maintained. These systems generally tend to require more complex encoding and decoding hardware. If the proper techniques are not used, transmission distances and data transmission integrity can be limited. If good techniques are used, very high data rates can be achieved.

In the design center, there are often requirements to use existing wiring such as in sprinkler systems where it is both cost effective and much less disruptive to the environment to use existing wiring. A typical system may have an individual wire to each valve and a common ground. This type of lay out is not well suited to high frequency encoding systems where transmission line characteristics are important. With conventional systems, adding additional valves means installing a new wire for each new valve.

Fowler (U.S. Pat. No. 4,093,946) teaches the fundamentals of communication over a two-wire system and method for interrogating a plurality of data gathering devices for actuation of selected ones from which data is received. Transducers, as taught by Fowler, are typically remotely located from the interrogating and receiving apparatus and are connected via a single two-conductor path over which power is conveyed to the transducers and data signals conveyed between the transducers and the receiving apparatus. Fowler teaches that turning on current source and causing a constant current to be propagated down cable can produce a binary signal. He continues that voltage modulation can be can be induced by alternately placing a high impedance and a short circuit across the conductors of the cable, while the current source is continuously enabled. The voltage on the cable can be caused to alternate between two binary states."

Shimada (U.S. Pat. No. 4,139,737) applies the two-wire communication concept through the addition of a time division multiplex transmission system in which electrical power is transmitted to remote terminals from a central unit simultaneously with address and control signals.

Shimada also references that adding modulators and demodulators to power lines was well known in 1979. "Alternatively a pair of transmission lines have been arranged between the central unit and the respective terminal units and, further, modulators and demodulators have been inserted between the central unit and the said transmission lines and between the respective terminal units and the transmission lines so that the address, control, response and the like signals have been superposed on electric power waves to be transmitted between the central unit and the respective terminal units. However, with this arrangement, the modulators and demodulators have been required, the system formation has been complicated and the cost reduction has not been able to be attained." This technique is widely used in both AC and DC two-wire systems. Systems with high frequency carriers require special care in impedance matching and layout and are limited in distance. They also require a certain level of cost and complexity.

Horn (U.S. Pat. No. 4,208,650) in 1980 teaches the concept of using a basic message protocol where "The transmitter is connected to a data containing unit and operates through a data cycle which addresses the data unit to provide a plurality of serially arranged message frames during each data cycle. Each message frame includes a marker bit, a sync word, data words having either digital or analog information, address and error words, a checkword, and various parity and start bits. The receiver, which is connected to another data unit, is adapted to recognize each message frame by means of the marker bit and the sync word, and evaluate the message validity by means of the parity and start bits, and the checkword."

These four patents teach the following principles:
1. Communicating and supplying power over a two-wire system,
2. Impressing a current source on a line and causing modulation on the line by sinking that current such that the voltage will fall to a low level where alternating changes between the high and low levels is detected and decoded by the intended receiver,
3. Each message frame includes a marker bit, a sync word, data words having either digital or analog information, address and error words, a checkword, and various parity and start bits.

There have been significant refinements and variations over time including the following. Each variation was developed to meet specific requirements demanded by the projected usage.

Demeyer, et al. (U.S. Pat. No. 5,089,974) in 1992 teaches a system similar to the present invention. The Demeyer abstract reads:

"A building power management controller comprises a plurality of modules connected by a two-wire network. Each module comprises a data transceiver device, controlled by a microprocessor, to both transmit data to the other modules and to a central unit via the two-wire network, and to receive information via this two-wire network. The modules are supplied with power by the two-wire network. When two modules transmit simultaneously, one takes priority so as not to disturb the messages transmitted."

Demeyer utilizes the concept taught by Fowler above, where a current source is applied and an alternate sink and high impedance load is used to generate the timing for the coding scheme. Demeyer also teaches that super imposed communication signals can be handled by sensing an out of phase bit through a comparator means where a difference in state between the output of the transmit bit and the input from the two-wire level sense comparator is sensed. The comparator is will indicate by an output level if there is a difference between the lines while the module is in the low state. The microcontroller in the module can sense this level and withdraw from the communication cycle letting the other device continue.

Demeyer does not teach the ability to use this capability to automatically configure the system.

BRIEF SUMMARY OF THE INVENTION

This invention teaches communication and power distribution design wherein both the power for operation of remote sensing elements and remotely actuated elements can be transmitted down a single pair of wires together with the communication or networking protocols necessary for operational control of and data gathering from the remote devices. While the techniques discussed are applicable to many control and data gathering activities, this invention is especially suitable for the control of heating and air conditioning systems, sprinkler control systems, security and lighting controls and industrial automation controls. The present invention teaches a novel and robust protocol particularly well suited for two-wire systems, such as irrigation systems, that were not specifically designed for data communications.

This two-wire system facilitates expansion by extending the existing wiring with additional two-wire lengths to reach the new locations. The two-wire system can be connected in a loop configuration that provides a redundancy level not available in other topologies. A loop provides the ability to continue to operate with a single break in the two-wire loop. In the heating and air conditioning environment, it is often difficult to add wire, and being able to use existing thermostat wiring can be an installation and cost advantage. The same holds for lighting and security control.

This invention also teaches a novel method to automate the discovery of new devices added to a two-wire system to facilitate automatic configuration. The method teaches using a specialized protocol that allows primitive wiring systems to be used to permit multiple devices to engage in sophisticated and reliable data communication.

DETAILED DESCRIPTION OF THE INVENTION

Figure 1:
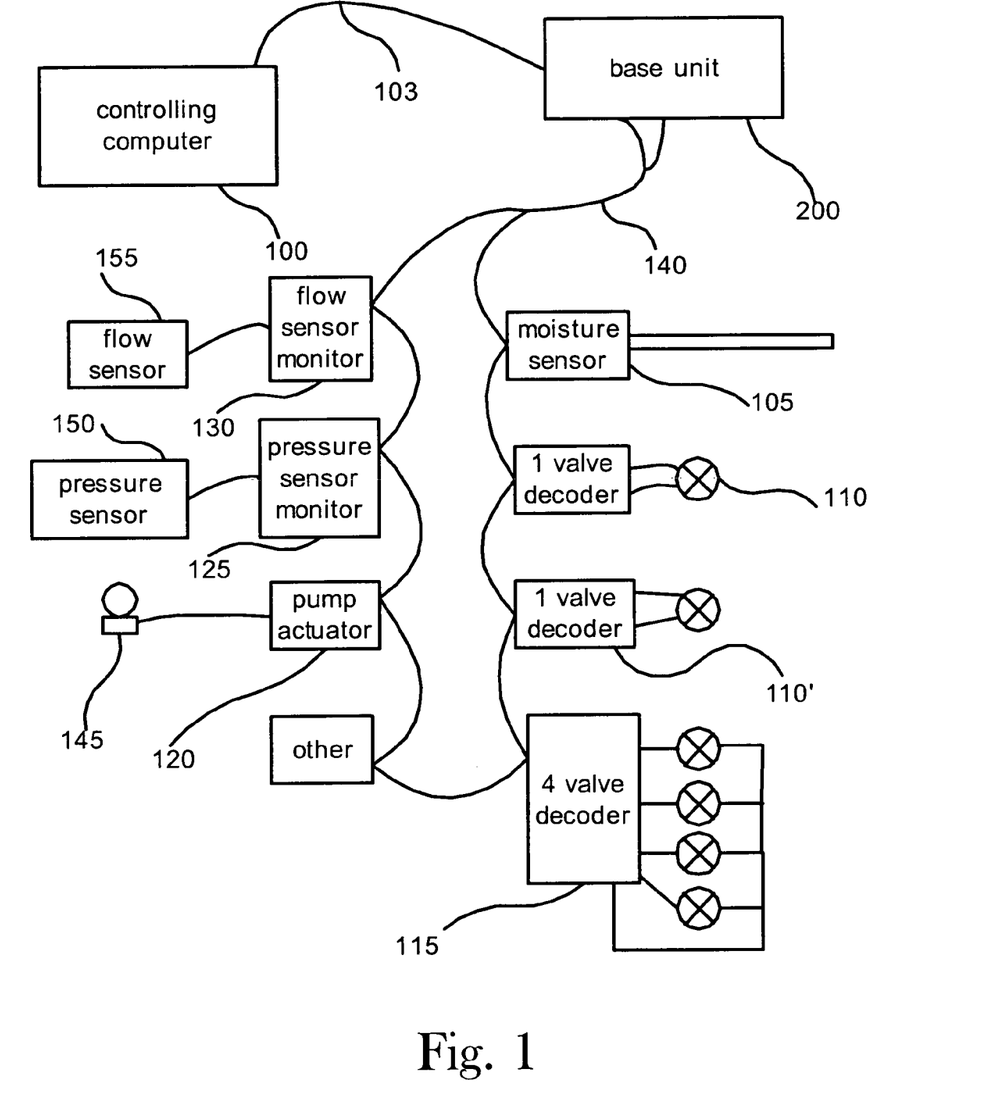
FIG. 1 is a high level system block diagram showing generally the present invention deployed as a typical representative irrigation system having a number of remote units connect by a two-wire bus.

FIG. 1 is a block diagram showing a typical embodiment the preferred embodiment of the present invention. Referring to FIG. 1, a controlling computer 100 is connected to a base unit 200 by a private interface 103. The base unit 200 is capable of communicating with a variety of remote units over a two-wire bus 140. Illustrative remote units include the moisture sensor 105, valve coders 110, 110', and 115, a pump actuator 120, a pressure sensor monitor 125, and a flow sensor monitor 130. The base units 200 and remote units are electrically connected with the two-wire bus 140. The two-wire bus 140 can be realized in a number of different ways, including a single pair of wires interconnecting each unit, or, alternatively, utilizing an existing wire with single ground and multiple power lines. In a typical deployment, remote units connected to the two-wire bus 140 function as controllers and have an additional, independent interface to a device they control. In FIG. 1, pump 145 is controlled by the pump actuator 120, the pressure sensor monitor 125 controls the pressure sensor 150 and the flow sensor monitor 125 controls the flow sensor 155. Similarly, the valve decoders 110 control the operation of the corresponding valves.

Figure 2A:
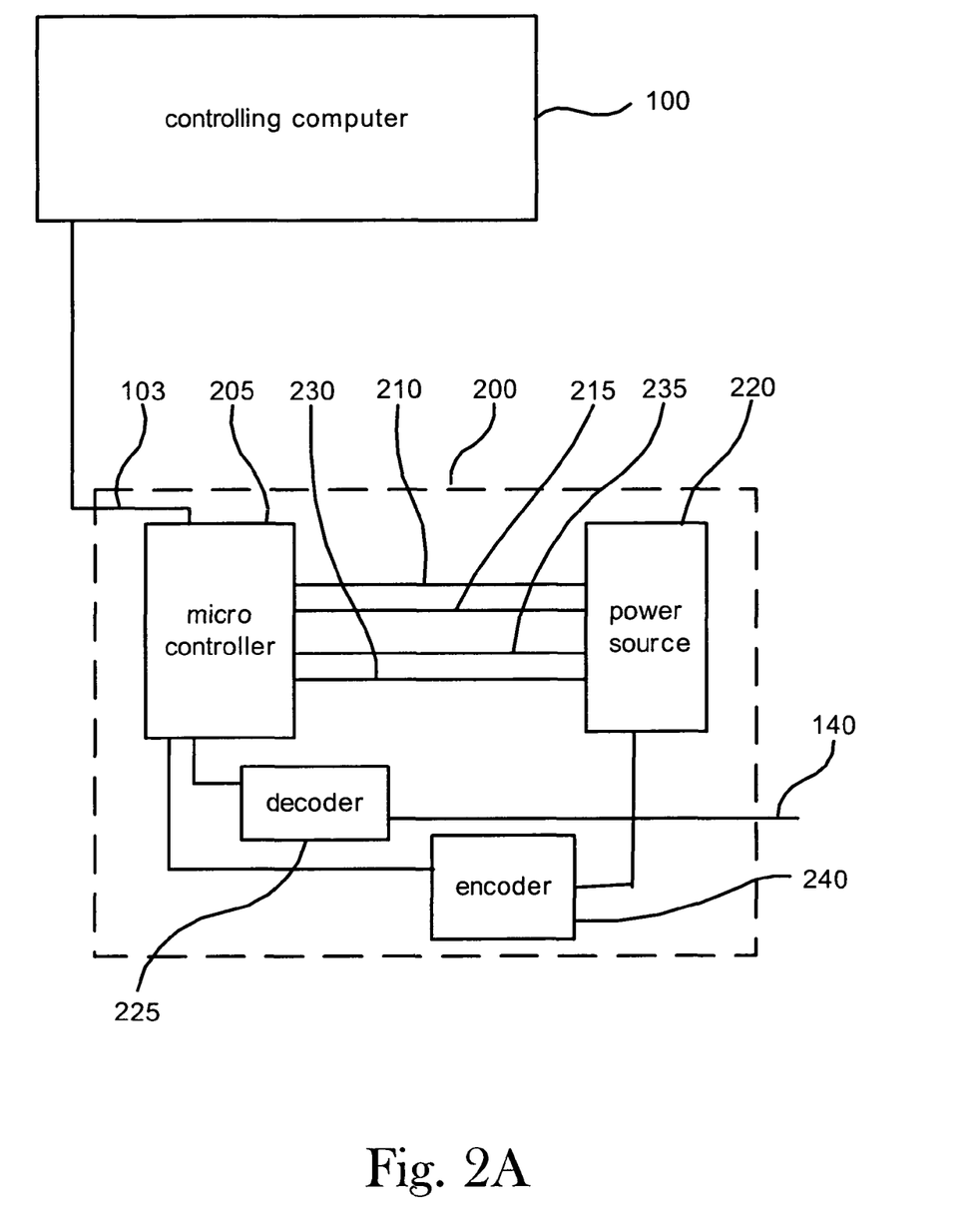
FIG. 2A depicts a block diagram of a base unit in accordance with the present invention.
Figure 2B:
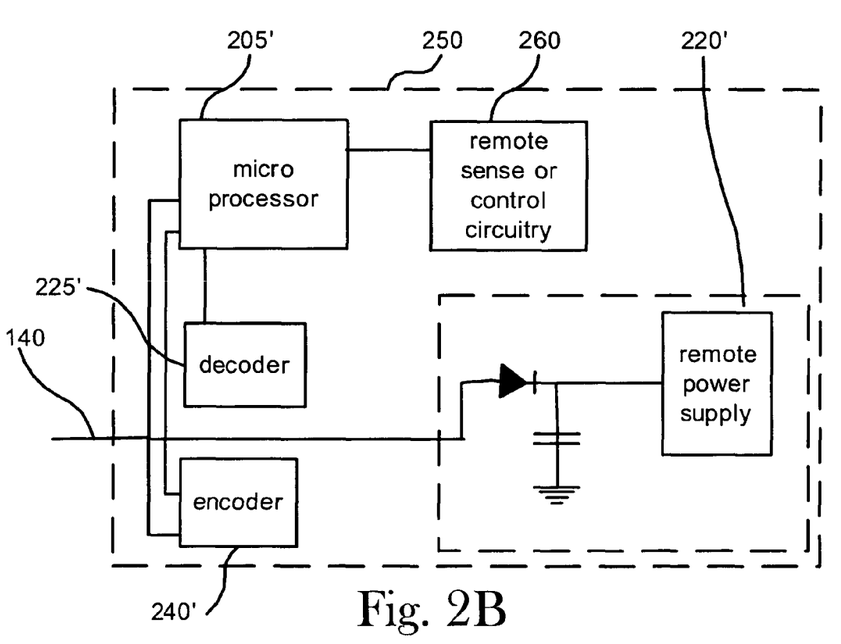
FIG. 2B is a block diagram of a remote unit in accordance with the present invention.

FIG. 2A shows a block diagram of a typical base unit and FIG. 2B shows a typical remote unit. Referring to FIG. 2A, the base unit 200 has a microcontroller 205, a power source 220, a decoder 225 capable of decoding messages delivered on the two-wire bus 140 and an encoder 240 capable of encoding messages for distribution on the two-wire bus 140. FIG. 2A shows several interfaces between the microcontroller 205 and the power source 220. Specifically, interface 210 is a signal from the microcontroller 205 to the power source 220 used to cause the power source to deliver high power to the two-wire bus 140. Analogously, interface 215 is used to signal low power, causing the power source 220 to deliver low power to the two-wire bus 140. Interfaces 230 and 235 are driven by the power source and provide sensing information to the microcontroller 205. Interface 230 delivers voltage sense status; interface 235 delivers current sense status. The encoder 240, controlled by the microcontroller 205 is used to encode commands and other data messages from the base unit 200 intended for a remote unit 250. The decoder 225 reads and decodes messages from the two-wire bus 140, allowing communication from remote units to the base unit 200.

During typical operation, the base unit 200 receives data from and transmits data to a control computer 100 using a standard interface 103 such as an industry standard Universal Serial Bus (USB) or an RS 232 interface, or alternative, a proprietary bus. Remote unit commands are encoded and delivered to the one or more remote units 250 for action on the two-wire bus 140. Responses are received from the remote devices 250 by the base unit 200 over the two-wire bus 140. The base unit 200 manages the basic two-wire bus 140 by detecting shorts and opens on the two-wire bus 140. The base unit 200 also has the ability to detect the basic quality of the transmission received, and monitor degradation of the two-wire bus 140 by accurately measuring the time between each transition and computing a quality factor based on the variation of the transition timing with the expected timing. The base unit 200 is composed of a microcontroller 205 that provides the computational processing necessary. The power source 220 provides power at two levels. The high power level, activated by raising the high power line 210 to a logical one, provides operational power for the devices. The device is current limited such that a shorted wire will not harm the system. The microcontroller 205 monitors the power provided to the two-wire bus 140 such that if it exceeds a preset level for a fixed length of time, the microcontroller 205 will shut down the power to the two-wire system and report to the controlling computer 100 that an "over current" situation has occurred. The microcontroller 205, using the current sense 235 and voltage sense lines 230 provided, monitors system power usage and is able to measure the voltage drop on the two-wire connection 140 during communication with a remote unit 250. This voltage drop is transformed into a resistance measurement of the wired connection, which provides an objective measurement of the quality of the two-wire bus 140, and can indicate degradation over time. The two-wire bus 140 is switched to low power mode in preparation for communications by lowering the high power line 220 and by raising the low power line 215, thus providing the appropriate power for the communication process. In another cost effective embodiment, the function of the controlling computer 100 is embedded in the base unit 200.

FIG. 2B shows a block diagram of a typical remote unit. Referring to FIG. 2B, a typical remote unit 250 has a microcontroller 205', remote sense/control circuitry 260, a decoder 225' an encoder 240', and a remote power supply 220'. Like the base unit encoder 240, the remote unit encoder 240' is used to encode messages provided by the microcontroller 205' for delivery on the two-wire bus 140. The decoder 225' is used to decode messages delivered on the two-wire bus 140. Communication sequences typically begin with the controlling computer 100 or sending a command to a base unit 200 of FIG. 2 over the private interface 103. The command will either be executed by the base unit 200 and a response returned to the computer, or it will be forwarded on to the two-wire bus 140 to a target remote device 250. In the latter case, the response message from the remote unit 250 will be received by the base unit 200 and then returned to the controlling computer 100. If the remote unit 250 does not respond within a specified time, an error response will be sent to the controlling computer 100 indicating the error condition.

Figure 3:
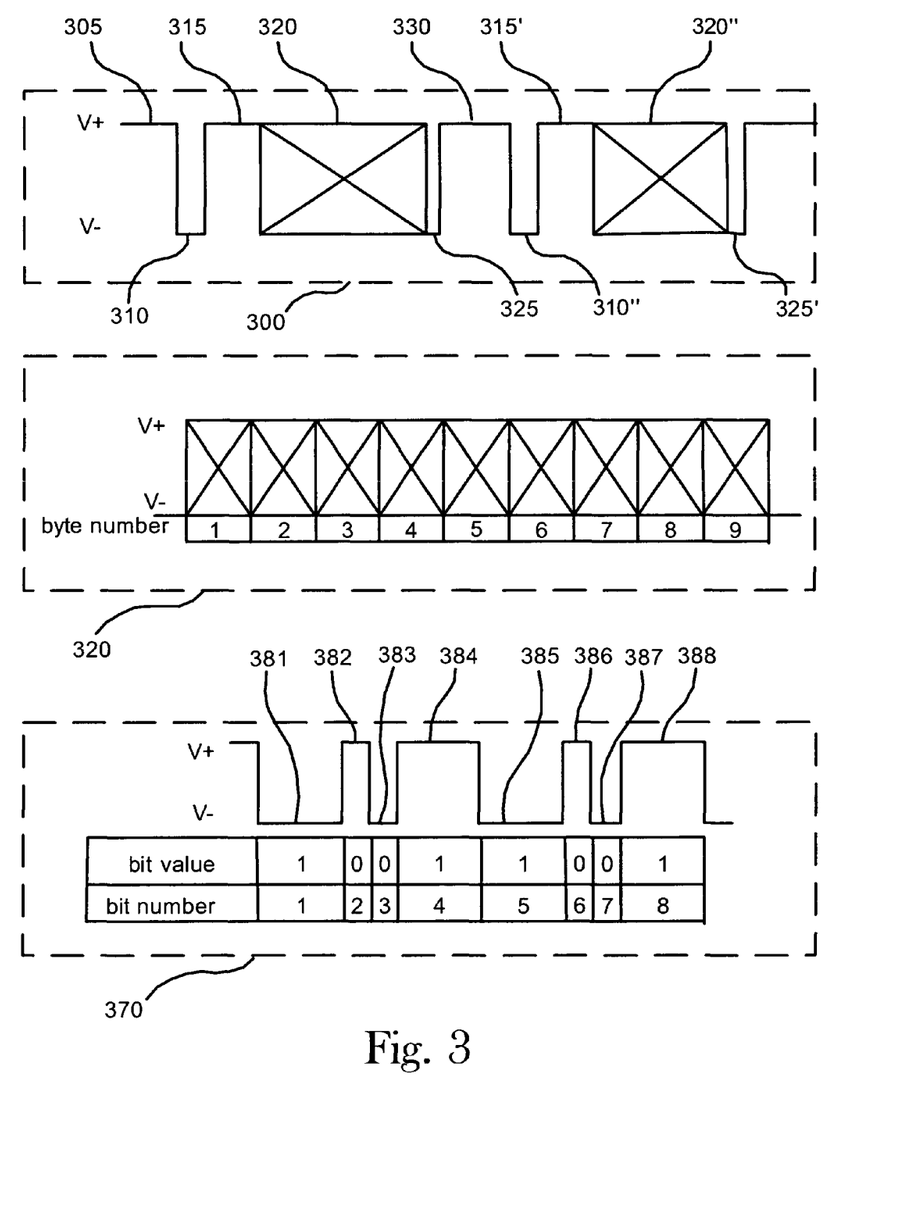
FIG. 3 is a diagram of the command and response message format and timing two-wire communication packet showing the various phases that forms a part of the encoding and decoding method in accordance with the preferred embodiment of the invention.

FIG. 3 is a timing diagram showing a detailed two-wire communication cycle. Diagram 300 at the top of FIG. 3 illustrates the timing associated with an entire communication cycle, including a command message sequence 320 and a response message 320'. The diagram in the middle of FIG. 3 illustrates a more detailed view the command and response messages 320 and 320'. Diagram 370 at the bottom of FIG. 3 illustrates a more detailed timing diagram for a single byte 1-9 of a command or response message 320. Referring to FIG. 3, the cycle begins in the high power phase 305, wherein the system is delivering full power to the remote devices 250 of FIG. 2 than then perform their individual functions. When the computer sends a command to the base unit 200 of FIG. 2 to be forwarded on to a remote device 250, the base unit 200 reduces the current available to power the two-wire system 140. The base unit encoder 240 of FIG. 2 then activates, pulling the voltage to ground 310, by sinking the sourced current to bring the two-wire voltage to a logical zero volt level. The low level 310 indicates to all remote units 250 that a message preamble has begun. After a prescribed preamble time, the encoder 240 then allows the voltage to rise to a logical high level 315 for a determined amount of time to complete the preamble of the message. Following the preamble, a multi-byte command 320 is encoded on the two-wire system 140. The encoder 240 of the base unit 200 encodes the command 320 as a multi-byte message, each byte further encoded on the two-wire bus 140 as a stream of serial bits, described in more detail below. A final "low" on the two-wire for a set amount of time signifies the post-amble 325, signaling the end of the command message.

Following the postamble 325 of a command message 320, the protocol allows the appropriate remote unit 250 to respond. The response is analogous to the command sequence just described except in the response phase, the remote unit 250, rather than the base unit 200, encodes, then asserts, the message on the two-wire bus 140. The preamble phase of the command phase ends in the high voltage state 330, analogous to the initial high voltage state 305. A response preamble 310' is asserted by pulling the two-wire system 140 to the low state for a specified period of time, ending with a high voltage assertion 315'. Following the response preamble 315' a multi-byte response message 320'. Following the response message, the remote unit 250 asserts a postamble phase 325' for a proscribed period time, and then returns to the high voltage state.

The multi-byte command message 320 and the multi-byte response message 320' are shown in more detail in middle diagram of FIG. 3, wherein a 10 byte message 351-359 is illustrated. Each message can be any number of bytes, the last byte being followed by the postamble indicator 325 or 325'. The bytes are asserted sequentially in time on the two-wire bus 140.

Diagram 370 illustrates the encoding of a typical byte. Each byte is encoded as a serial stream of bits by alternating from a low to high state. In the preferred embodiment, the bytes are encodes as 8 bits bytes numbered 1-8. Bits 1, 3, 5, and 7 (381, 383, 385, and 387) are encoded on low voltage cycles and bits 2, 4, 6 and 8 (382, 384, 386, and 388) are encoded on high voltage phases. The first bit 381 is pulled low by the encoder sinking current to bring the voltage on the two-wire system to a logical zero. If the communicated bit is a "one" then the bit is held low for three units of time. If the communicated bit is a "zero" the bit is held low for only one unit of time. In the example illustrated in timing diagram 370, bits 1, 4, 5, and 8 are "ones" and bits 2, 3, 6, and 7 are "zeros" resulting in an encoded byte value of 10011001. At the conclusion of the required time specified by the bit being a "one" or a "zero" the encoder releases the line and the current source in the power source drives the two-wire potential to full voltage. The voltage remains at the high level for one unit of time if the next bit is a "zero" bit or three units of time if the bit is a "one" bit. This process continues until each bit of the data field, in the communication cycle, has been impressed on the two-wire bus. A final "low" on the two-wire for a set amount of time signifies the post-amble or end of message. In the preferred embodiment, "zero" bits are one unit of time long, and the "one" bits are three units of time long, but any encoding where the time units are of substantially different durations will suffice.

The basic concept of utilizing one time period for a logical one and different time period for a logical zero is well known in the art and was first used between 1970 and 1980 to encode computer data on computer magnetic tapes. The prior art technique is disfavored in many modern applications because it requires at least one transition per bit and contains a DC component that is difficult to decode accurately in a magnetic read channel. However, in the present invention, the disfavored technique has been adapted in a novel way in the present invention to be very useful, resulting in a cost effective solution that works well in an electrically hostile environment. The present invention enhances the technique by adding the necessary definition, preambles and postambles necessary to form a unique and cost effective communication solution for hostile environments, such as sprinkler control systems with existing two-wire systems already in place. In the preferred embodiment, the two-wire signal moves between zero volts and the power supplies voltage and therefore is well adapted to a signal containing a direct current (DC) component.

In the preferred embodiment, both the command message 320 and the response message 320' are composed of a number of eight bit bytes. A protocol is imposed on the format of the command and response messages so that the desired functionality can be achieved. The system operates on a command and response operation model. The controlling computer 100 sends a command 320 to a base unit 200. The system provides an addressing method for communicating with multiple base units 200. This command 320 is either processed by the base unit 200 or the encapsulated message is forwarded to the addressed remote unit 250 over the two-wire system 140.

When the addressed base unit 200 has processed the command, if the command requires a response, the base unit 200 composes a response message 320' and sends it back to the computer. If the command is a pass-through command, the encapsulated message is sent over the two-wire network 140 to the addressed remote unit 250. The base unit 200 will then wait for a response 310' from the remote unit 250. This response 310' will be encapsulated by the base unit 250 and then sent forward to the controlling computer 100. If there is no response from a remote unit 250 within the allowable time, then an error message is sent to the controlling computer 100 indicating that no message was received. In the preferred embodiment, all messages are protected by checksum codes to verify message integrity. The base 140 unit does not interpret messages that are passed-through to remote units 250.

Figure 4A:
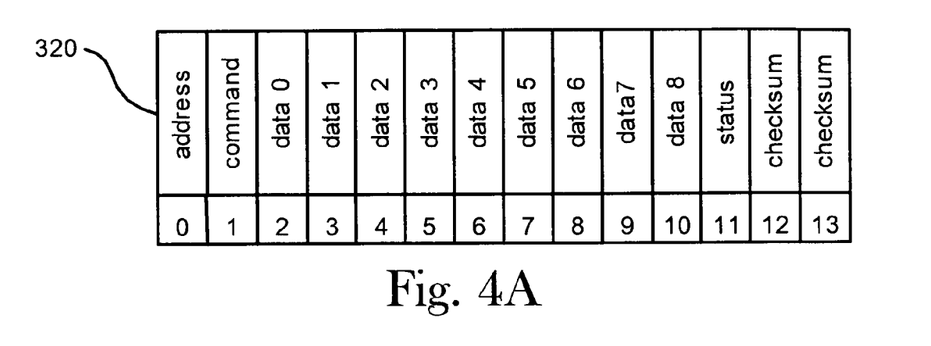
FIG. 4A, FIG. 4B, and FIG. 4C show detailed format of the data portions of command and response messages of the preferred embodiment.
Figure 4B:
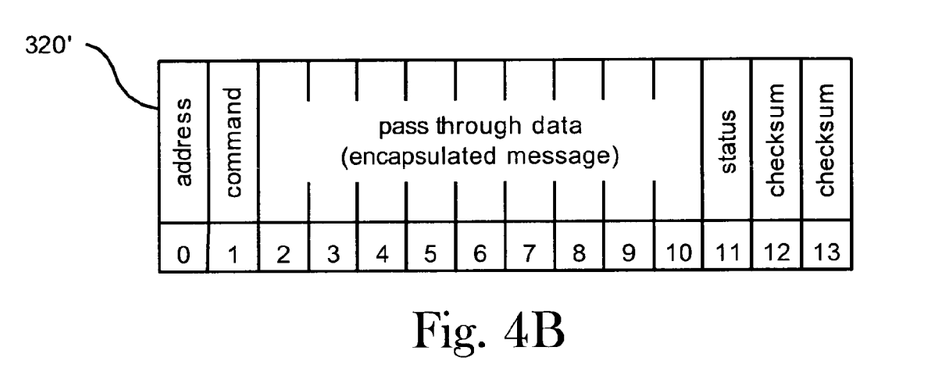
Figure 4C:
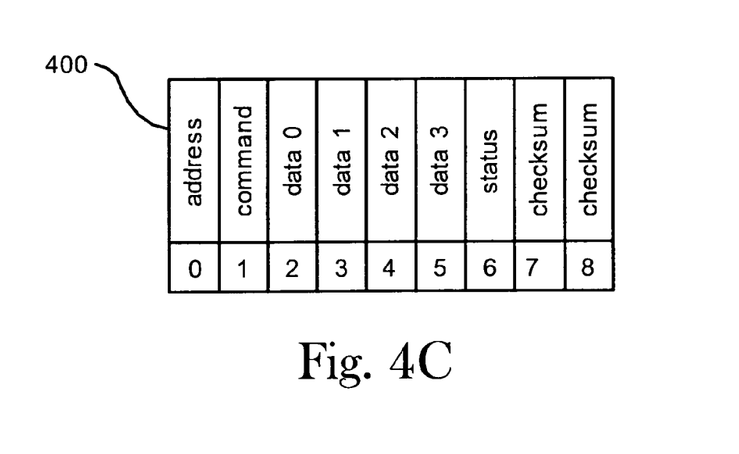

FIG. 4A, FIG. 4B, and FIG. 4C are representations of the command/response level protocols that are used to communicate between the controlling computer, one or more the base units, and one or more remote units. Specifically, FIG. 4A represents a message from the controlling computer to a base unit 200. Referring to FIG. 4A, the preferred embodiment uses a fourteen byte message 320. The first byte of the message is the address of the base unit 200 to which the command 320 is addressed. The next nine bytes composed the body of the message. The last two bytes are checksum composed of the sum of the previous seven bytes.

FIG. 4B represents a message 320 from the controlling computer to a remote unit 250 through a base unit 200. The format is identical to that of FIG. 4a except the nine data bytes, bytes 2-10, contain an encapsulated message intended to a remote device 250. The format of the encapsulated portion of the message 400 is shown in FIG. 4C, and consists of an address of the remote unit 250, and a command for that remote unit. The addressed device, either a base unit 200 or remote device 250 computes the checksum on the data bytes and compares it to the received check sum. If the checksums are identical, the message is valid. If they are not, the message is deemed corrupted during transmission and is discarded.

At the conclusion of the reception of a command message 320, the remote units 250 can use this time to perform any commands sent during the command sequence. At the end of the minimum specified processing time, the remote unit 250 addressed by the command message activates and sends a preamble. The remote encoder 240' sinks the current supplied by the base unit power source 220 bringing the voltage on the two-wire bus 140 to a logical zero. The low level indicates that communication from the remote unit 250 will follow. After a prescribed period, the remote encoder 240' then allows the voltage to rise to a logical high level allowing the base unit 200 to prepare for the communication cycle to follow. The remote devices 250 use the same protocol for communication and hold the bus low for one unit of time if the bit is a "zero" and three units of time if the bit is a logical "one". The entire message is composed of nine bytes. Each byte is composed of eight bits. The first seven bytes composed the body of the response message. The last two bytes are a checksum composed of the sum of the previous six bytes. The base unit computes the checksum on the first seven bytes and compares it to the received checksum. If they are identical, the message is valid. If they are not, the message has been corrupted during transmission and is discarded.

In addition to provide robust communications between the controlling computer 100, one or more base units 200 and one or more remote units 250, the present invention also teaches a novel, robust system and method for device detection. In the preferred embodiment, every remote unit 250 has a unique serial number. When the system is configured, each remote unit 250 is assigned a unique address on the two-wire system 140 such that it can be addressed easily and independently. During the configuration process, it is advantageous for the system to be able to perform an auto discovery function and detect all remote units 250 connected to the two-wire system 140. The method of the preferred embodiment of detecting potential collision and avoiding data corruption is novel and enables this robust auto detection and identification function. The two-wire power is supplied through a current source 220 that pulls the two-wire voltage 140 to the required voltage level. An encoder 240 on the base unit 200 or the encoder 240' on one of the remote units 250 sinking the current and pulling the two-wire voltage low produces a logical two-wire low level. The encoders are open collector or open drain devices and as such can be activated concurrently without damaging the device. However, if two devices both answer and attempt to send a full response, the response from both devices would mix and produce a corrupted return. The method of collision avoidance requires that prior to each transition from a high two-wire voltage to a low two-wire voltage; the sending unit checks the level of the two-wire voltage before activating its encoder. If the voltage is low already, the remote 250 does not enable the encoder 240' and terminates sending the response message 320'. This allows the competing response messages 320' to be sent without corruption. The system discovers the remote units 250 on the system by transmitting a return serial number command to all remote units 250. Each remote unit 250 will attempt to transmit its serial number. Each remote unit 250 will wait a pseudo-random delay before attempting to send a response 320'. As each remote unit 250 begins to send a preamble 310', it checks to see if the line is already low using the remote sense/control circuitry 260. If the two-wire 140 is already low, the remote unit 250 discontinues its response 320' and will wait for the next command 320 from the base unit 200. Because the remote units 250 start their response messages 310' with some time variance, most of the remote units 250 will drop off during the generation of the preamble 310. If by chance multiple remote units 250 happen to send a synchronized 310' preamble, remote units 250 will dropout as they detect potential collisions with their data stream. As a remote unit 250 detects a potential collision, it will back off and wait for the next command 320, allowing the other remote unit 250 to complete without error. Because each remote unit 250 has a unique serial number, each remote unit 250 will be responding with a different data stream, which will guarantee that only a single remote unit will complete successfully. The remote unit 250 that communicates its serial number successfully is then given a command to "sleep" and the process is repeated until all remote units are found and put into a sleep state. Remote units 250 no longer respond when in the sleep state. All remote units 250 will have been found when there is no response 320' to the return serial number command.

The description thus provided illustrates the preferred embodiment of the invention and is provided by way of illustration and not limitation. One skilled in the art can and likely would make variations that are nonetheless within the scope and spirit of the invention. For example, variations involving the exact ordering and definition of the command protocols, the voltage levels whether AC or DC used, the types of systems deployed are examples of the parameters and contemplated by the present invention. The invention should only be limited by the claims as set forth below:

We claim:

1. A system including a controller for controlling and monitoring a base module and a plurality of remote equipment modules, the base module further comprising a power source capable of powering each remote equipment module, the equipment environment further includes a first electrical wire and a second electrical wire forming a two wire bus wherein said base module and each said remote equipment module are electrically attached to said two wire bus, the controller comprising:

a switch means capable of being either off or on, wherein when on, full power is applied to the first and second electrical wires, wherein when off, power on the first and second electrical wire is current limited, thereby allowing bidirectional low power data transfer along said two wire bus, wherein each remote equipment module receives operating power from said base module over the two wire bus only when switch means is on, wherein said controller is enabled to transfer data between said base module and each said remote equipment module on said first and second electrical wires when said first and second electrical wires are current limited, using a low power communications protocol the communications protocol deploys a two wire communications cycle, the communication cycle further comprises:

a first phase, the first phase is a full power cycle phase wherein the current is limited and the base module initiates a command, a second phase, the second phase is a communications phase, wherein current is limited and the base module initiates a command that is transmitted on the first and second electrical wire to at least one interface, thereby delivering said command to at least one of said remote equipment modules, a third phase, the third phase is a full power phase wherein the command is executed by the device, a fourth phase, the fourth phase is a response phase wherein current is limited and the equipment module responds to the command, the response is transmitted to the base module on the first and second electrical wires.

2. The system of claim 1 further comprising a preamble phase, the preamble phase occurs between the first phase and the second phase, wherein the preamble phase further comprises a zero power segment followed by a high power segment.

3. The system of claim 1 further comprising a post command phase, the post command phase occurs immediately after the command phase.

4. The system of claim 1 further comprising a post response phase, the post response phase occurs immediately after the response phase.

5. The system of claim 1 wherein the control system is an irrigation system and the equipment modules are water delivery valves.

6. The system of claim 1 wherein the communication phase further comprises a data stream of binary data wherein each binary datum has a first and second state wherein one state indicated by switching to a short circuit across the two wire bus and the other state is indicated by switching to an open circuit across the two wire bus.

7. The system of claim 1 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

8. The system of claim 1 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

9. The system of claim 2 further comprising a post command phase, the post command phase occurs immediately after the command phase.

10. The system of claim 2 further comprising a post response phase, the post response phase occurs immediately after the response phase.

11. The system of claim 2 wherein the control system is an irrigation system and the equipment modules are water delivery valves.

12. The system of claim 2 wherein the communication phase further comprises a data stream of binary data wherein each binary datum has a first and second state wherein one state indicated by switching to a short circuit across the two wire bus and the other state is indicated by switching to an open circuit across the two wire bus.

13. The system of claim 2 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

14. The system of claim 2 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

15. The system of claim 9 further comprising a post response phase, the post response phase occurs immediately after the response phase.

16. The system of claim 9 wherein the control system is an irrigation system and the equipment modules are water delivery valves.

17. The system of claim 9 wherein the communication phase further comprises a data stream of binary data wherein each binary datum has a first and second state wherein one state indicated by switching to a short circuit across the two wire bus and the other state is indicated by switching to an open circuit across the two wire bus.

18. The system of claim 9 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

19. The system of claim 9 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

20. The system of claim 15 wherein the control system is an irrigation system and the equipment modules are water delivery valves.

21. The system of claim 15 wherein the communication phase further comprises a data stream of binary data wherein each binary datum has a first and second state wherein one state indicated by switching to a short circuit across the two wire bus and the other state is indicated by switching to an open circuit across the two wire bus.

22. The system of claim 15 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

23. The system of claim 15 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

24. The system of claim 20 further comprising a controller and data link, the data link further including the first electrical wire and the second electrical wire wherein the control system executes the phases of the protocol, delivers sprinkler valve control commands through the data link during communication phases and delivers power during the power through the data link during power phases.

25. The system of claim 20 wherein the communication phase further comprises a data stream of binary data wherein each binary datum has a first and second state wherein one state indicated by switching to a short circuit across the two wire bus and the other state is indicated by switching to an open circuit across the two wire bus.

26. The system of claim 20 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

27. The system of claim 20 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

28. The system of claim 24 wherein the first electrical wire and the second electrical wire are configured as a two wire bus.

29. The system of claim 24 the first electrical wire and the second electrical wire are configured as a star network of two wire pairs.

30. The system of claim 24 further includes a plurality of first electrical wires wherein the first electrical wires and the second electrical wire are configured such that the first wire connects each remote module with the base module and the second electrical wire functions as a common electrical return.

31. The system of claim 24 wherein the communication phase further comprises a data stream of binary data wherein each binary datum has a first and second state wherein one state indicated by switching to a short circuit across the two wire bus and the other state is indicated by switching to an open circuit across the two wire bus.

32. The system of claim 24 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

33. The system of claim 24 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

34. The system of claim 28 the first electrical wire and the second electrical wire are configured as a star network of two wire pairs.

35. The system of claim 28 further includes a plurality of first electrical wires wherein the first electrical wires and the second electrical wire are configured such that the first wire connects each remote module with the base module and the second electrical wire functions as a common electrical return.

36. The system of claim 28 wherein the communication phase further comprises a data stream of binary data wherein each binary datum has a first and second state wherein one state indicated by switching to a short circuit across the two wire bus and the other state is indicated by switching to an open circuit across the two wire bus.

37. The system of claim 28 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

38. The system of claim 28 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

39. The system of claim 34 further includes a plurality of first electrical wires wherein the first electrical wires and the second electrical wire are configured such that the first wire connects each remote module with the base module and the second electrical wire functions as a common electrical return.

40. The system of claim 34 wherein the communication phase further comprises a data stream of binary data wherein each binary datum has a first and second state wherein one state indicated by switching to a short circuit across the two wire bus and the other state is indicated by switching to an open circuit across the two wire bus.

41. The system of claim 34 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

42. The system of claim 34 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

43. The system of claim 39 wherein the communication phase further comprises a data stream of binary data wherein each binary datum has a first and second state wherein one state indicated by switching to a short circuit across the two wire bus and the other state is indicated by switching to an open circuit across the two wire bus.

44. The system of claim 39 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

45. The system of claim 39 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

46. The system of claim 43 wherein the communication phase further comprises a data stream of binary data wherein each binary datum has a first and second state wherein one state is indicated by switching between short circuit and open circuit for a first time period and the second state is indicated by switching between short circuit and open circuit for a second time period.

47. The system of claim 43 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

48. The system of claim 46 further including a base module and a plurality of remote modules, the first and second electrical wires form a two-wire bus, wherein the base modules and the remote modules are electrically connected to the two-wire bus, the base modules and the remote modules communicate using the communications protocol, wherein equipment attached to the remote modules are controlled and managed by the base module.

49. The system of claim 48 wherein the base module further includes a first microcontroller, a first encoder and a first decoder,
wherein the first encoder transforms commands from the first microcontroller into the communication protocol for transmission on the two-wire bus to at least one remote module,
and the first decoder transforms data from the two-wire bus into the communications protocol for delivery to the first microcontroller.

50. The system of claim 48 wherein each remote module further includes a second microcontroller, a second encoder and a second decoder,
wherein the second encoder transforms commands from the second microcontroller into the communication protocol for transmission on the two-wire bus to the base module,
and the second decoder transforms data from the two-wire bus into the communications protocol for delivery to the second microcontroller.

51. The system of claim 49 wherein each remote module further includes a second microcontroller, a second encoder and a second decoder,
wherein the second encoder transforms commands from the second microcontroller into the communication protocol for transmission on the two-wire bus to the base module,
and the second decoder transforms data from the two-wire bus into the communications protocol for delivery to the second microcontroller.

* * * * *